United States Patent [19]

Pyzik et al.

[11] Patent Number: 5,196,238
[45] Date of Patent: Mar. 23, 1993

[54] METHOD FOR FORMING A CERMET POROUS CERAMIC COMPACT AND HEATING THE METAL SO THAT IT MELTS AND FLOWS INTO THE PORES OF THE CERAMIC

[75] Inventors: Aleksander J. Pyzik, Midland; Jack Ott, Hemlock, both of Mich.

[73] Assignee: The Dow Chemical Company, Midland, Mich.

[21] Appl. No.: 660,370

[22] Filed: Feb. 25, 1991

[30] Foreign Application Priority Data

Aug. 14, 1990 [UK] United Kingdom ............... 9017823

[51] Int. Cl.⁵ ............................................... B05D 3/12
[52] U.S. Cl. ....................................... 427/347; 427/357; 427/376.3; 427/385.5; 427/398.1; 164/97; 164/98
[58] Field of Search ................ 164/97, 98; 427/376.3, 427/357, 383.5, 347, 398.1

[56] References Cited

U.S. PATENT DOCUMENTS 4,834,938  5/1989  Pyzik et al. ............................ 264/60
4,935,055  6/1990  Aghajorinn et al. ................... 164/97
5,039,633  8/1991  Pyzik et al. ........................... 501/93

Primary Examiner—Shrive Beck
Assistant Examiner—Benjamin L. Utech

[57] ABSTRACT

A method of infiltrating a porous ceramic compact with a molten metal to form a cermet is disclosed. A solid-phase metal is disposed on a surface of a porous ceramic compact. The surface of the porous ceramic compact is at an angle to the horizontal which is sufficient to allow molten metal formed from the solid-phase metal to rupture an oxide layer at least partially supporting the molten metal. The solid-phase metal is heated to a temperature sufficient to melt the solid-phase metal and to allow the molten metal formed to rupture the oxide layer. The molten metal flows through an opening in the metal oxide layer formed by the rupture and infiltrates the porous ceramic compact. The porous ceramic compact, containing the molten metal, is then cooled to a temperature whereby the molten metal solidifies, thereby forming a cermet.

6 Claims, 5 Drawing Sheets

METHOD FOR FORMING A CERMET POROUS CERAMIC COMPACT AND HEATING THE METAL SO THAT IT MELTS AND FLOWS INTO THE PORES OF THE CERAMIC

BACKGROUND OF THE INVENTION

Cermets are refractories which include a ceramic component and a metal component. Examples of cermets include metal and ceramic carbides, such as: titanium carbide (TiC), molybdenum (Mo) and nickel (Ni); tungsten carbide (WC) and cobalt (Co); and tungsten carbide (WC) and nickel (Ni). Typically, cermets have properties which neither the ceramic component nor the metal component exhibit alone.

One method of forming cermets includes disposing a solid-phase metal on top of a porous ceramic compact. The solid-phase metal is then heated to a temperature above its melting point to cause the metal to become molten. The molten metal infiltrates the pores in the porous ceramic compact and forms a cermet upon cooling.

Often, however, the metal component includes metal oxides which are present as impurities. These impurities can form a metal oxide layer surrounding the molten metal during melting which prevents infiltration of the porous ceramic compact. Alternatively, metal oxides can form in situ by reaction of the metal component with oxygen in the surrounding atmosphere during melting of the metal component.

In one technique to overcome this problem, the porous ceramic compact and molten metal are exposed to a pressure which is significantly higher or lower than atmospheric pressure. However, exposure of the porous ceramic compact and metal to such pressures at temperatures sufficient to melt the metal often requires the use of specialized furnaces which limit mass production of cermets to batch-type processing, as opposed to continuous-type processing. Further, the location of rupture of the metal oxide layer at the molten metal generally cannot be predetermined, thereby limiting control of infiltration by the metal after the metal oxide layer has ruptured.

A need exists, therefore, for a method of infiltrating molten metal into a porous ceramic compact to form a cermet which overcomes or minimizes the above-mentioned problems.

SUMMARY OF THE INVENTION

The present invention relates to a new method of infiltrating a porous ceramic compact with a molten metal to form a cermet.

In this method, a solid-phase metal is disposed on a surface of the porous ceramic compact. The surface has an angle to the horizontal sufficient to cause molten metal formed from the solid-phase metal to rupture an oxide layer which is at least partially supporting the molten metal. The solid-phase metal is heated to a temperature above its melting point to cause the solid-phase metal to melt and form molten metal. The molten metal, because of the angle, ruptures the metal oxide layer, whereby an opening is formed in the metal oxide layer through which the molten metal flows. The molten metal thereby infiltrates pores of the porous ceramic compact and form the cermet. The porous ceramic compact, containing the molten metal, is then cooled to a temperature which causes the molten metal to solidify, thereby forming the cermet.

The present invention has many advantages. For example, a porous ceramic compact can be infiltrated with a molten metal to form a cermet without exposing the molten metal to a pressure which is significantly higher or lower than atmospheric pressure. Also, the metal oxide layer formed during melting of the metal can be ruptured without having to employ furnaces which operate at pressures which vary significantly from atmospheric. In addition, infiltration at atmospheric pressure allows formation of cermet articles by continuous-type processing in an open furnace, as opposed to batch-type processing in a sealed furnace operating under pressure or vacuum. Further, the location of metal oxide layer rupture generally is predetermined to be at a lower portion of the molten metal adjacent to the ceramic compact. Significantly greater control of molten metal infiltration can be achieved by predetermining the location of oxide layer rupture.

DETAILED DESCRIPTION OF THE INVENTION

The features and other details of the method of the invention will now be more particularly described with reference to the accompanying drawings and pointed out in the claims. The same number present in different figures represents the same item. It will be understood that the particular embodiments of the invention are shown by way of illustration and not as limitations of the invention. The principle features of this invention can be employed in various embodiments without departing from the scope of the invention.

Figure 1:
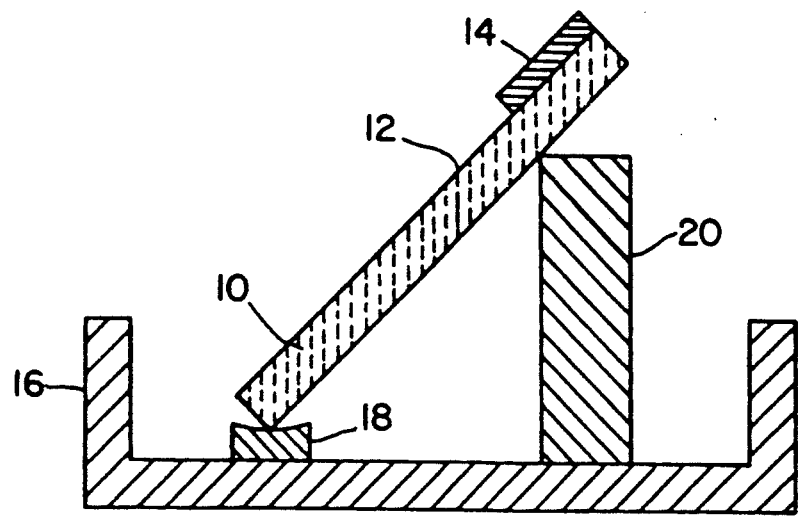
FIG. 1 is a section view of a solid-phase metal disposed on a porous ceramic compact.

One embodiment of this invention is illustrated in FIG. 1. A porous ceramic compact 10 has a solid-phase metal 14 disposed on its upper surface 12. Porous ceramic compact 10 is formed of a suitable ceramic powder. Examples of suitable ceramic powders include: carbides, such a $B_4C$, SiC, TiC, $MoC_2$ and WC; borides, such as $TiB_2$, $SiB_6$, $AlB_2$; silicides, such as MoSi; nitrides, such as AlN, $SiN_4$ and TiN; oxides, such as $SiO_2$; etc. In a preferred embodiment, the ceramic powder is $B_4C$.

Porous ceramic compact 10 is formed by a suitable method, such as is known in the art. For example, the ceramic powder of porous ceramic compact 10 can be mixed with water, a binder, a dispersant and a press lubricant by a suitable method to form a wet mixture. The wet mixture is then formed into a porous ceramic compact by a suitable method, such as by uniaxial pressing, isostatic pressing, etc.

Porous ceramic compact 10 can have many different shapes. Examples of suitable shapes of the ceramic compact include cylinders, discs, cones, spheres, cubes, and the shape of a finished cermet.

Solid-phase metal 14 is formed of a metal which is suitable for infiltrating porous ceramic compact 10 to form a cermet. Examples of suitable metals include aluminum, magnesium, titanium, etc. It is to be understood, however, that the metal can be an alloy or mixture of metals, as well as pure metal. Solid-phase metal 14 can include an oxide of the metal in an amount sufficient to form a metal oxide layer, upon melting the metal, which at least partially supports the consequent molten metal and can rupture to thereby release the molten metal. Solid-phase metal 14 is a solid block. Preferably, solid-phase metal has a base which is broader than its height. In a particularly preferred embodiment, solid-phase metal 14 is a disc, having a base diameter of about four inches and a height of about one-half inch.

Porous ceramic compact 10 and solid-phase metal 14 are disposed in refractory crucible 16. Porous ceramic compact 10 is supported on supports 18,20. Examples of a suitable refractory crucible 16 and supports 18,20 are formed of aluminum nitride, aluminum oxide, graphite, etc. Porous ceramic compact 10 is arranged on supports 18,20 so that upper surface 12 is disposed at an angle to the horizontal. The angle is sufficient to cause molten metal, formed from solid-phase metal 14, to rupture an oxide layer which is at least partially supporting the molten metal, at a desired temperature. In one embodiment, the angle is in the range of between about five and about ninety degrees. In a preferred embodiment, the angle is in the range of between about 25° and about 45° C.

Solid-phase metal 14 is retained on upper surface 12 by gravity and friction. The amount of metal in solid-phase metal 14 is sufficient to fill the void space of porous ceramic compact 12. Solid-phase metal is disposed at the upper end of upper surface 12.

Figure 2:
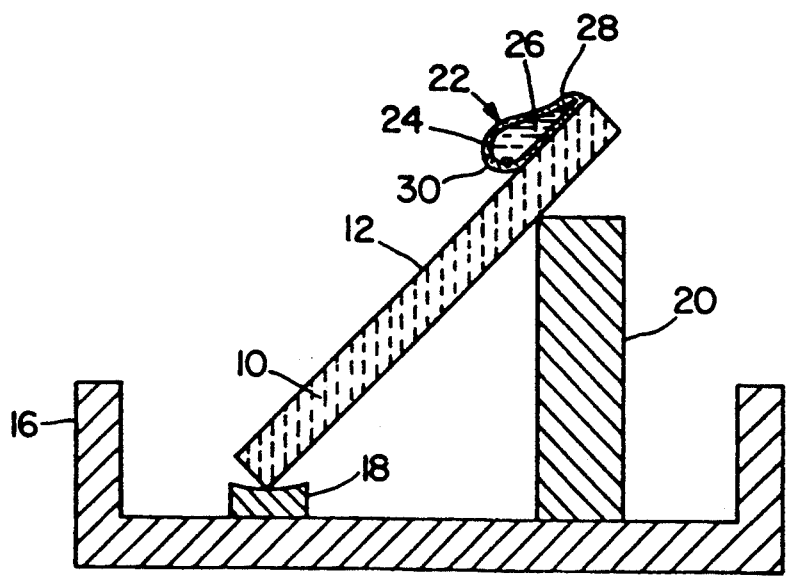
FIG. 2 is a section view of molten metal disposed on the porous ceramic compact.

Refractory crucible 16, within which porous ceramic compact 10 and solid-phase metal 14 are disposed, is loaded into a suitable furnace, not shown. A suitable furnace is a furnace capable of heating porous ceramic compact 10 to a temperature above the melting point of solid-phase metal 14. Solid-phase metal 14 is exposed to a temperature sufficient to cause solid-phase metal 14 to melt and form molten-phase metal 22, shown in FIG. 2.

Examples of suitable atmospheres in which solid-phase metal 14 is melted include oxidizing atmospheres and inert atmospheres. Preferably, the atmosphere includes an inert gas, such as nitrogen, argon, etc. In a particularly preferred embodiment, the atmosphere is substantially comprised of argon and is flowed through the furnace at a pressure of about one atmosphere and at a rate in the range of between about 0.01 and about one liter per minute. The temperature to which solid-phase metal 14 is exposed to form molten phase metal 22 is at least the melting point of the metal of solid-phase metal 14.

As solid-phase metal 14 melts to form molten-phase metal 22, metal oxides collect at the surface of molten-phase metal 22. The metal oxides can be present as impurities in solid-phase metal 14. The amount of metal oxides present as impurities is preferably below about three percent by weight of solid-phase metal 14. Alternatively, where the atmosphere includes oxygen, the metal oxides can form spontaneously during melting of solid-phase metal 14 by oxidation of the metal in solid-phase metal 14. The metal oxides form metal oxide layer 24 which surround molten metal 26 of molten-phase metal 22. The amount of metal oxides which collect at the surface of molten-phase metal 22 is sufficient, at the melting point of molten metal 26, to support molten metal 26 at exposed surface 28 of molten-phase metal 22.

The angle of upper surface 12 causes a significantly higher portion of the weight of molten metal 26 to be supported at lower portion 30, adjacent to upper surface 12, than at the remainder of exposed surface 28. Molten-phase metal 22 is then raised to a temperature above the melting point of molten metal 26 which is sufficient to allow molten metal 26 to rupture metal oxide layer 24.

Figure 3:
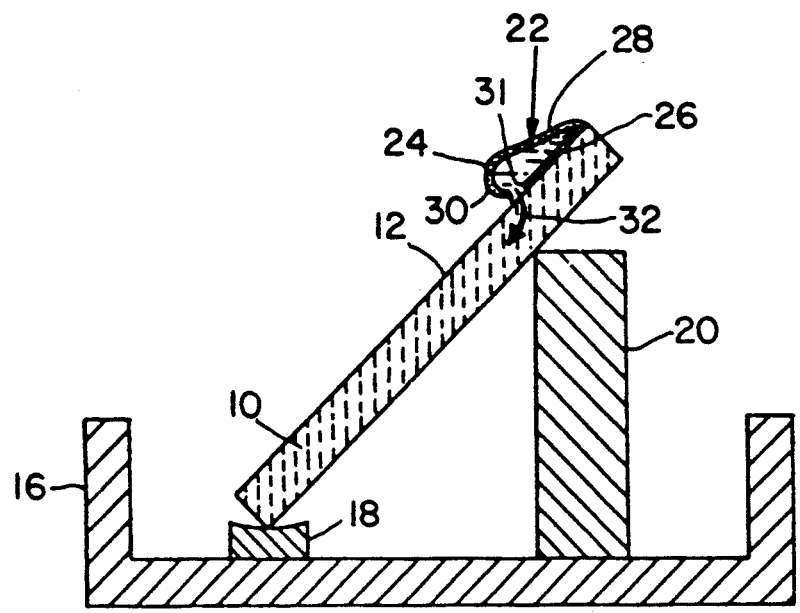
FIG. 3 is a section view of infiltration of the molten metal into the porous ceramic compact.

Metal oxide layer 24 ruptures at lower portion 30, thereby allowing molten metal 26 to flow through an opening 31 formed by the rupture, as can be seen in FIG. 3. Molten metal 26 flows through opening 31 and onto upper surface 12 at a point on upper surface 12 which is adjacent lower portion 30. Molten metal 26 flowing through the opening 31 in metal oxide layer 24 infiltrates porous ceramic compact 10 through upper surface 12, as indicated by arrow 32. Porous ceramic compact 10 is infiltrated by molten metal 26 until the void space in porous ceramic compact 10 is filled. Infiltration can proceed by gravitational force and by capillary attraction of molten metal 26 within the pores extending through porous ceramic compact 10. The pore size of porous ceramic compact 10 is suitable for allowing capillary attraction between the ceramic of porous ceramic compact 10 and molten metal 26 in the pores to be sufficient to infiltrate upwardly through porous ceramic compact 10 from opening 31. Preferably, the pore size of porous ceramic compact 10 is in the range of between about five and about fifty microns.

Figure 4:
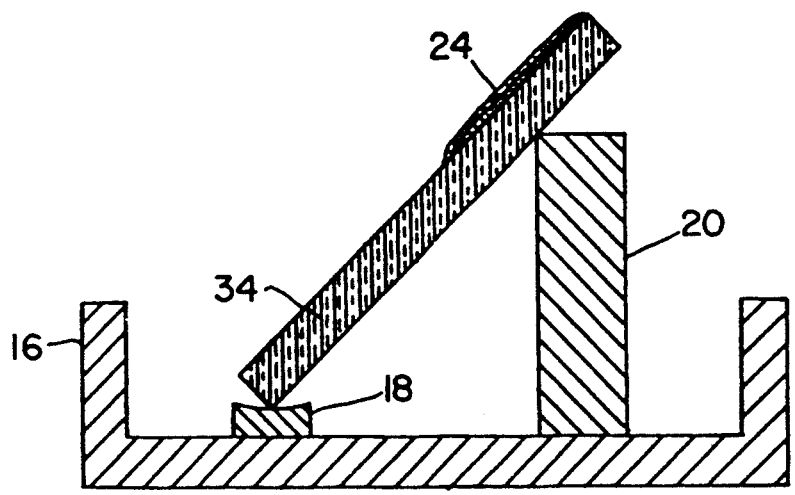
FIG. 4 is a section view of a cermet formed following infiltration of the molten metal.

Porous ceramic compact 10, containing molten metal 26, is then cooled to a temperature below the melting point of molten metal 26, thereby causing molten metal 26 to solidify and form cermet 34, shown in FIG. 4. Metal oxide layer 24 remains on ceramic powder compact 10 during cooling of ceramic powder compact 10 and molten metal 26. The thickness of metal oxide layer 24 is typically up to about 0.1 microns. The remaining metal oxide layer 24 can be removed by a suitable method, such as by grinding, polishing, etc. Cermet 34 can be finished by a suitable method, such as is known in the art, to form a finished cermet.

Figure 5:
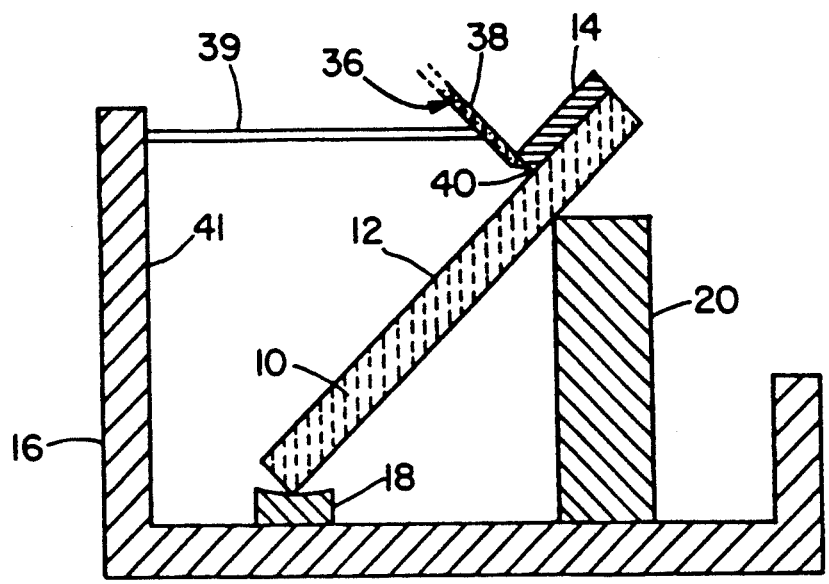
FIG. 5 is a section view of a solid-phase metal disposed on the porous ceramic compact and supported by a blade.

Another embodiment of the method of the invention is illustrated in FIG. 5. As shown, blade 36, having a blade shank 38 and a blade edge 40, abuts solid-phase metal 14 and is disposed in spaced relation from upper surface 12 of porous ceramic compact 10. Blade 36 is formed of a suitable material for supporting the metal of solid-phase metal 14 during infiltration of the metal into porous ceramic compact 10. Examples of suitable materials of blade 36 include AlN, $Al_2O_3$, etc.

Blade 36 is supported by rod 39. Rod 39 is fixed to blade shank 38 and to crucible wall 41. Rod 39 is formed of a material which will not significantly deform at a temperature sufficient to allow infiltration of the metal into porous ceramic compact 10. In one embodiment, rod 39 is made of graphite.

Blade shank 38 is disposed at an angle to upper surface 12 which is sufficient to support solid-phase metal 14 at upper surface 12. An example of a suitable angle to upper surface 12 is about ninety degrees. The distance of blade edge 40 from upper surface 12 is sufficient to allow a metal oxide layer formed during melting of solid-phase metal 14 to rupture. Preferably, the distance of blade edge 40 from upper surface 12 is in the range of between about one and about three millimeters.

Figure 6:
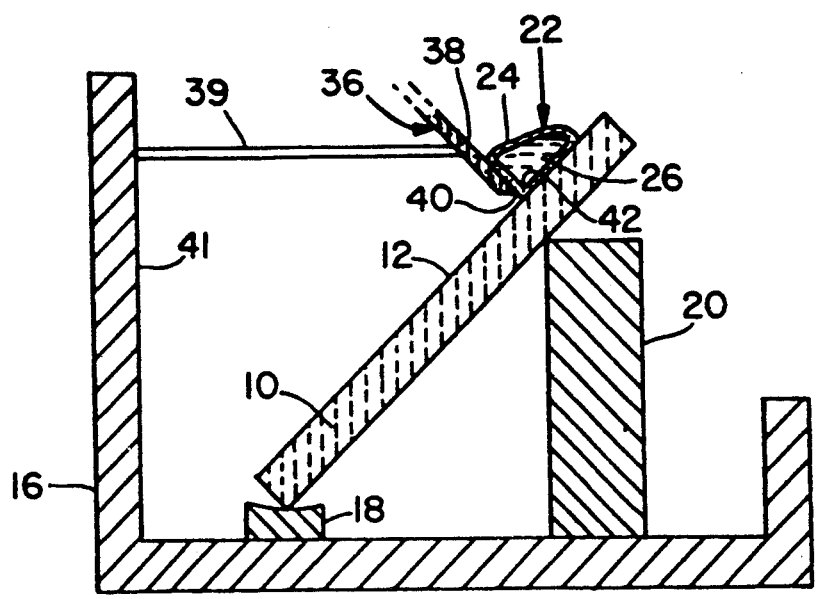
FIG. 6 is a section view of molten-phase metal adjacent the blade.

Porous ceramic compact 10, solid-phase metal 14 and blade 36 are exposed to conditions sufficient to melt and thereby form molten-phase metal 22, as described in the method of the invention illustrated in FIGS. 1 through 4. As illustrated in FIG. 6, molten-phase metal 22 includes metal oxide layer 24 which is formed during melting of solid-phase metal 14. Metal oxide layer 24 surrounds molten metal 26. Molten metal 26 is supported by upper surface 12 and by blade 36. Lower portion 42 of metal oxide layer 24 supports molten metal 26 between upper surface 12 and blade edge 40.

Figure 7:
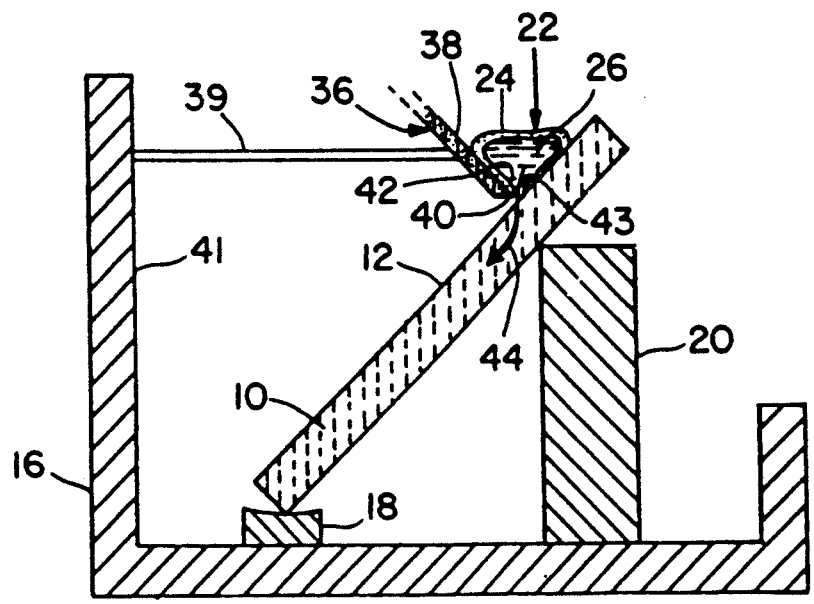
FIG. 7 is a section view of infiltration of the molten metal into the porous ceramic compact.

The temperature of porous ceramic compact 10, molten-phase metal 22 and blade 36 is then raised above the melting point of molten metal 26 to a temperature sufficient to allow molten metal 26 to rupture metal oxide layer 24 at lower portion 42. Rupture of metal oxide layer 24 at lower portion 42 allows molten metal 26 to flow through opening 43 formed by the rupture, as can be seen in FIG. 7. Molten metal 26 thereby flows underneath blade edge 40 and onto upper surface 12. Molten metal 26 then infiltrates porous ceramic compact 10 through a portion of upper surface 12 proximate to blade edge 40, as indicated by arrow 44.

The rate of infiltration of molten metal 26 into porous ceramic compact 10 is at least partially determined by the distance of blade edge 40 from upper surface 12. The distance of blade edge 40 from upper surface 12 can be adjusted by moving blade 36. Movement of blade 36 closer to upper surface 12 narrows the distance between blade edge 40 and upper surface 12, thereby slowing the rate of flow of molten metal 26 beneath blade edge 40 and slowing infiltration of molten metal 26 into porous ceramic compact 10. Conversely, movement of blade 36 away from porous ceramic compact 10 increases the rate of infiltration by molten metal 26. The rate of infiltration of molten metal 26 into ceramic compact 10 can thereby be controlled.

Molten metal 26 flows beneath blade edge 40 and infiltrates porous ceramic compact 10 until the void space of porous ceramic compact 10 is filled. Porous ceramic compact 10, containing molten metal 26, is then cooled to solidify the molten metal 26 and thereby form a cermet.

Figure 8:
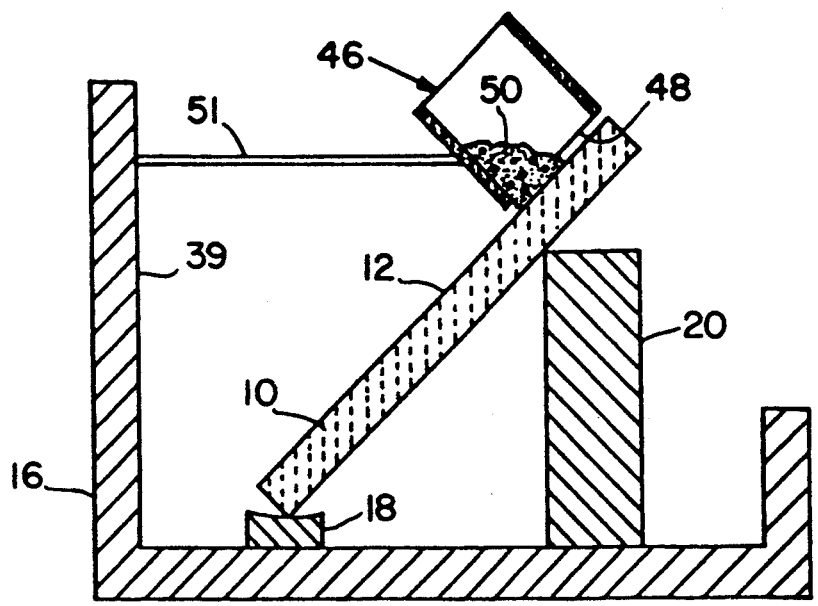
FIG. 8 is a section view of a solid-phase metal powder disposed on a porous ceramic compact and supported by a ring.

In still another illustration of the invention, illustrated in FIG. 8, ring 46, having lower edge 48, abuts solid-phase metal powder 50 and is disposed in spaced relation to upper surface 12 of porous ceramic compact 10. It is to be understood that ring 46, or other retaining means, could be employed with a single block of metal, such as solid-phase metal 14, illustrated in FIG. 1.

Ring 46 is supported by rod 51. Rod 51 is fixed to ring 46 and to crucible wall 39. Rod 51 is formed of a material which will not significanly deform at a temperature sufficient to allow infiltration of the metal into porous ceramic powder compact 10. In one embodiment, rod 51 is formed of graphite.

Solid-phase metal powder 50 includes a metal which is suitable for infiltrating porous ceramic compact 10. The distance of ring 46 from upper surface 12 is sufficient to allow a molten metal formed from solid-phase metal powder 50 to flow beneath lower edge 48 and infiltrate upper surface 12. In one embodiment, the distance of lower edge 48 from upper surface 12 is in the range of between about one and about five millimeters. Ring 46 is formed of a suitable material for supporting a molten-phase metal formed from solid-phase metal powder 50. Examples of such suitable materials include AlN, $Al_2O_3$, etc.

Figure 9:
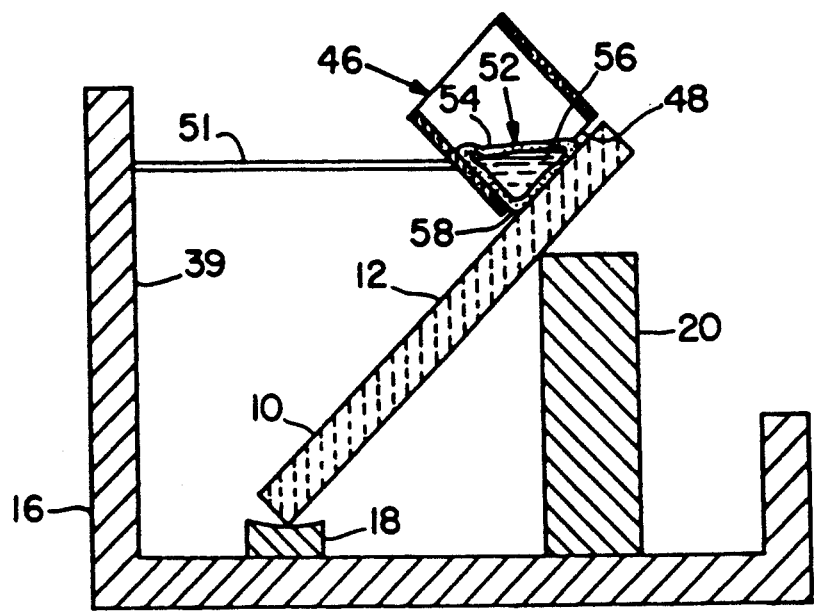
FIG. 9 is a section view of a molten-phase metal adjacent the ring.

Porous ceramic compact 10, ring 46 and solid-phase metal powder 50 are exposed to sufficient conditions, such as disclosed in the embodiments of the invention illustrated in FIGS. 1 through 7, to cause solid-phase metal powder 50 to melt and form molten-phase metal 52, illustrated in FIG. 9. Metal oxide layer 54 of molten-phase metal 52 forms as solid-phase metal powder 50 melts. Molten metal 56 is surrounded by metal oxide layer 54. Lower portion 58 of metal oxide layer 54 supports molten metal 56 between upper surface 12 and lower edge 48.

Figure 10:
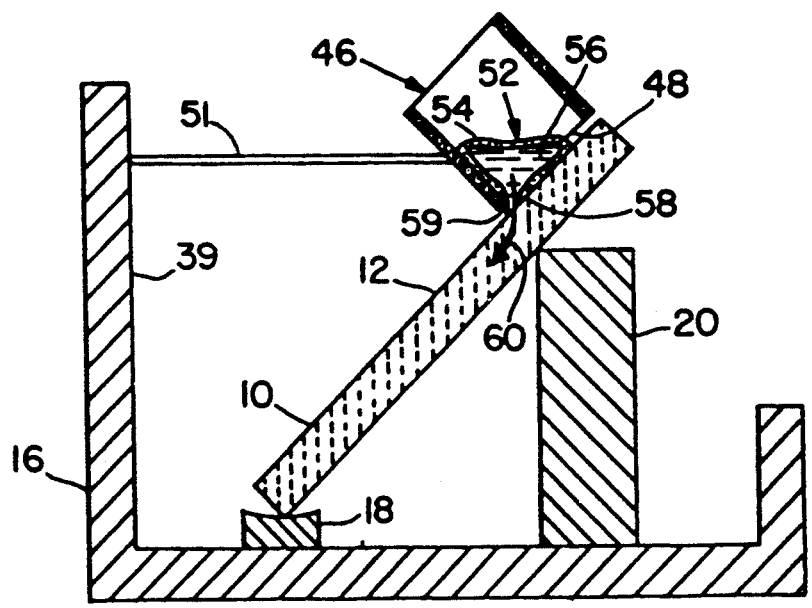
FIG. 10 is a section view of infiltration of the molten metal into the porous ceramic compact.

The temperature of porous ceramic compact 10, ring 46 and molten-phase metal 52 is then raised to a temperature above the melting point of molten metal 56 which is sufficient to cause metal oxide layer 54 to rupture at lower portion 58 of metal oxide layer 54. Molten metal 56 then flows through opening 59 formed by the rupture in metal oxide layer 54 at lower portion 58. Molten metal 56 flows beneath lower edge 48 of ring 46 onto upper surface 12, as can be seen in FIG. 10. Molten metal 56 thereby infiltrates porous ceramic compact 10 by passing through upper surface 12 at a portion of upper surface 12 proximate to lower edge 48, as indicated by arrow 60. The rate of infiltration of molten metal 56 into porous ceramic compact 10 can be controlled by raising or lowering ring 46 relative to upper surface 12.

Molten metal 56 infiltrates porous ceramic compact 10 until the void space of porous ceramic compact 10 is filled. Porous ceramic compact 10, containing molten metal 56, is then cooled to allow molten metal 56 to solidiby, thereby forming a cermet.

The invention will now be further and specifically described by the following example. All parts and percentages are by weight unless otherwise stated.

EXEMPLIFICATION

Two ceramic powder compacts were formed of ESK 1500 grade boron carbide ($B_4C$) ceramic powder, commercially available from Electroschmelzwerk Kempten GmbH. The ceramic powder compacts were shaped as discs having a diameter of three inches (7.5 cm) and a thickness of 0.3 inches (0.8 cm). Each disc weighed about 141.2 grams and had a void space of about twenty-eight percent of the total volume of the discs. Two refractory crucibles, formed of graphite, were placed in a graphite element electrode furnace, commercially available from Centorr Associates, Inc. A porous ceramic compact was placed in each refractory crucible. A first porous ceramic compact was placed on aluminum nitride supports in a refractory crucible so that a flat upper side of the porous ceramic compact was level. A second porous ceramic compact was disposed in another refractory crucible so that a flat upper side of the porous ceramic compact was disposed at a forty-five degree angle to the horizontal. On each porous ceramic compact, one hundred fifty grams of aluminum alloy (2139 Al, commercially available from Alcoa), having an average particle size of about forty microns, was disposed on the upper flat surface of each porous ceramic compact.

The furnace was vacuum-purged three times with a gas including argon and hydrogen (five percent hydrogen by volume) to remove oxidizing gases. The argon and hydrogen-containing gas was then flowed through the furnace at atmospheric pressure at a rate of about 0.1 liters per minute. The furnace temperature was then raised at a rate of 20° C. per minute to a temperature of 1180° C. The temperature was held at 1180° C. for a period of time of one hour. The ceramic powder compacts were subsequently allowed to cool to about 20° C. at a rate of 20° C. per minute. The disks were removed from the furnace.

The aluminum alloy did not infiltrate the first porous ceramic compact. The aluminum alloy appeared not to have broken through the aluminum oxide layer. In contrast, aluminum alloy infiltrated the second porous ceramic compact to an amount greater than about 90% of the void space. Cooling of the second porous ceramic compact caused the aluminum alloy to solidify, thereby forming a cermet.

EQUIVALENTS

Those skilled in the art will recognize, or be able to ascertain using no more than routine experimentation, many equivalents to the specific embodiment of the invention described herein. Such equivalents are intended to be encompassed in the scope of the following claims.

We claim:

1. A method of forming a cermet, comprising the steps of:
    a) disposing a solid-phase metal, which can form a metal oxide, on a surface of a porous ceramic compact, said surface having an angle to the horizontal in the range of between about five and about ninety degrees, said angle being sufficient to allow a molten metal phase formed from the solid-phase metal to rupture a layer of the metal oxide which is at least partially supporting the molten metal;
    b) heating the solid-phase metal to a temperature sufficient to cause the solid-phase metal to melt and form the molten metal phase and the metal oxide layer, and whereby the molten metal ruptures the metal oxide layer to form an opening in the metal oxide layer through which the molten metal phase flows, thereby allowing the molten metal phase to infiltrate pores of the porous ceramic compact; and
    c) cooling the porous ceramic compact, containing the molten metal phase, to a temperature which causes the molten metal phase to solidify thereby forming the cermet.

2. The method of claim 1 further including the step of disposing a retaining means adjacent the solid-phase metal for controlling the rate of infiltration of molten metal.

3. The method of claim 2 wherein the solid-phase metal and porous ceramic compact are heated in an atmosphere which is at about atmospheric pressure.

4. A method of forming a cermet, comprising the steps of:
    a) disposing a solid-phase metal, which can form a metal oxide, on a surface of a porous ceramic compact, said surface having an angle to the horizontal sufficient to allow molten metal phase formed from the solid-phase metal to rupture a layer of the metal oxide which is at least partially supporting the molten metal;
    b) disposing a ceramic blade in spaced relation to an upper surface of the porous ceramic compact and adjacent to the solid-phase metal for controlling the rate of infiltration of the molten metal;
    c) heating the solid-phase metal to a temperature sufficient to cause the solid-phase metal to melt and form the molten metal phase and the metal oxide layer, and whereby the molten metal ruptures the metal oxide layer to form an opening in the metal oxide layer through which the molten metal phase flows, thereby allowing the molten metal phase to infiltrate pores of the porous ceramic compact; and
    d) cooling the porous ceramic compact, containing the molten metal phase, to a temperature which causes the molten metal phase to solidify, thereby forming the cermet.

5. A method of forming a cermet, comprising the steps of:
    a) disposing a solid-phase metal, which can form a metal oxide, on a surface of a porous ceramic compact, said surface having an angle to the horizontal sufficient to cause molten metal phase formed from the solid-phase metal to rupture a layer of the metal oxide which is at least partially supporting the molten metal;
    b) disposing a ceramic ring in spaced relation to the surface of the ceramic compact and adjacent to the solid-phase metal for controlling the rate of infiltration of the molten metal;
    c) heating the solid-phase metal to a temperature sufficient to cause the solid-phase metal to melt and form the molten metal phase and the metal oxide layer, and whereby the molten metal ruptures the metal oxide layer to form an opening in the metal oxide layer through which the molten metal phase flows, thereby allowing the molten metal phase to infiltrate pores of the porous ceramic compact; and
    d) cooling the porous ceramic compact, containing the molten metal phase, to a temperature which causes the molten metal phase to solidify, thereby forming the cermet.

6. In a method of infiltrating a porous ceramic compact with a molten metal to form a cermet by disposing a solid-phase metal on a surface of the porous ceramic compact and heating the solid-phase metal to a temperature sufficient to melt the solid-phase metal:
    The improvement comprising disposing the surface of the cermet at an angle to the horizontal sufficient to allow the molten metal, which can form a metal oxide, formed form the solid-phase metal to rupture a metal oxide layer, which is at least partially supporting the molten metal, to form an opening in the metal oxide layer through which the molten metal flows, thereby allowing the molten metal to infiltrate the porous ceramic compact for forming the cermet.

* * * * *